US010919493B2

(12) United States Patent
Elangovan et al.

(10) Patent No.: US 10,919,493 B2
(45) Date of Patent: Feb. 16, 2021

(54) MOBILE DEVICE RELAY ATTACK DETECTION AND POWER MANAGEMENT FOR VEHICLES

(71) Applicant: Ford Global Technologies, LLC, Dearborn, MI (US)

(72) Inventors: Vivekanandh Elangovan, Canton, MI (US); Aaron Matthew DeLong, Toledo, OH (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 15/892,030

(22) Filed: Feb. 8, 2018

(65) Prior Publication Data

US 2019/0241154 A1 Aug. 8, 2019

(51) Int. Cl.
*B60R 25/00* (2013.01)
*B60R 25/24* (2013.01)
*G07C 9/00* (2020.01)
*H04W 48/04* (2009.01)

(52) U.S. Cl.
CPC .......... *B60R 25/24* (2013.01); *B60R 25/245* (2013.01); *G07C 9/00309* (2013.01); *H04W 48/04* (2013.01); *B60R 2325/101* (2013.01); *B60R 2325/205* (2013.01); *G07C 2009/00357* (2013.01); *G07C 2009/00547* (2013.01); *G07C 2009/00555* (2013.01); *G07C 2009/00793* (2013.01); *G07C 2209/63* (2013.01)

(58) Field of Classification Search
None
See application file for complete search history.

(56) References Cited

U.S. PATENT DOCUMENTS

| 8,930,045 | B2 | 1/2015 | Oman et al. |
| 9,842,445 | B2* | 12/2017 | Lin ................ B60R 25/20 |
| 9,852,560 | B2* | 12/2017 | Bauman ............ G07C 9/00309 |
| 9,855,918 | B1* | 1/2018 | Melaragni ............... B60R 25/01 |
| 10,035,494 | B2* | 7/2018 | Sute ....................... H02J 50/12 |
| 10,124,768 | B1* | 11/2018 | Bocca ................ G07C 9/00309 |

(Continued)

FOREIGN PATENT DOCUMENTS

WO WO 2005114593 A1 12/2005

OTHER PUBLICATIONS

Aurelien Francillon et al., *Relay Attacks on Passive Keyless Entry and Start Systems in Modern Cars*, 2010, 15 pages.

(Continued)

*Primary Examiner* — Jonathan M Dager
(74) *Attorney, Agent, or Firm* — Frank Lollo; Eversheds Sutherland (US) LLP

(57) ABSTRACT

Method and apparatus are disclosed for mobile device relay attack detection and power management for vehicles. An example vehicle includes a first module for first protocol communication, a second module for second protocol communication, and a controller. The controller is to determine a first distance to a mobile device utilizing a signal strength of the first protocol communication and determine, upon receiving an entry request, a second distance to the mobile device utilizing a time-of-flight of the second protocol communication. The controller also is to prevent entry when the second distance does not match the first distance.

16 Claims, 6 Drawing Sheets

(56) References Cited

U.S. PATENT DOCUMENTS

| | | | | |
|---|---|---|---|---|
| 10,223,853 | B1* | 3/2019 | Okada | H04W 12/00503 |
| 10,477,346 | B2* | 11/2019 | Bruckner | G07C 9/28 |
| 10,573,104 | B2* | 2/2020 | Jain | G07C 9/28 |
| 2008/0143500 | A1* | 6/2008 | Ghabra | B60R 25/24 340/426.36 |
| 2010/0076622 | A1* | 3/2010 | Dickerhoof | B60R 25/24 701/2 |
| 2010/0321154 | A1* | 12/2010 | Ghabra | G07C 9/00309 340/5.61 |
| 2012/0268242 | A1* | 10/2012 | Tieman | B60R 25/24 340/5.61 |
| 2013/0342379 | A1* | 12/2013 | Bauman | G01S 13/0209 342/21 |
| 2014/0240090 | A1* | 8/2014 | Mutti | B60R 25/24 340/5.61 |
| 2014/0330449 | A1* | 11/2014 | Oman | B60R 25/01 701/2 |
| 2014/0340193 | A1* | 11/2014 | Zivkovic | G07C 9/00309 340/5.61 |
| 2014/0375420 | A1* | 12/2014 | Seiberts | B60R 25/20 340/5.31 |
| 2015/0015367 | A1* | 1/2015 | Lin | B60R 25/20 340/5.63 |
| 2015/0161834 | A1 | 6/2015 | Spahl et al. | |
| 2015/0222658 | A1* | 8/2015 | Kim | H04L 63/1466 726/22 |
| 2015/0363988 | A1 | 12/2015 | Van Wiemeersch et al. | |
| 2016/0075307 | A1* | 3/2016 | Jakobsson | G07C 9/00309 701/2 |
| 2016/0117877 | A1* | 4/2016 | Hamada | G07C 9/00309 340/5.61 |
| 2016/0225203 | A1* | 8/2016 | Asmar | G07C 9/00309 |
| 2016/0234008 | A1* | 8/2016 | Hekstra | G01S 13/751 |
| 2016/0292941 | A1* | 10/2016 | Miyazawa | G07C 9/00309 |
| 2016/0297397 | A1* | 10/2016 | Ko | B60R 25/24 |
| 2016/0320469 | A1 | 11/2016 | Laifenfeld et al. | |
| 2017/0085128 | A1 | 3/2017 | Garcia Briz et al. | |
| 2017/0106834 | A1* | 4/2017 | Williams | G07C 9/28 |
| 2017/0129456 | A1* | 5/2017 | Miyazawa | B60R 25/24 |
| 2017/0136990 | A1* | 5/2017 | Tercero | B60R 25/01 |
| 2017/0158169 | A1* | 6/2017 | Luo | B60R 25/245 |
| 2017/0327083 | A1* | 11/2017 | Verkin | G07C 9/00 |
| 2018/0007078 | A1* | 1/2018 | Motos | H04L 63/1416 |
| 2018/0007507 | A1* | 1/2018 | Ghabra | G01S 5/021 |
| 2018/0056936 | A1* | 3/2018 | Parasurama | B60R 25/245 |
| 2018/0056937 | A1* | 3/2018 | Pflug | B60R 25/04 |
| 2018/0056939 | A1* | 3/2018 | van Roermund | B60R 25/24 |
| 2018/0099640 | A1* | 4/2018 | Ludger | B60R 25/30 |
| 2018/0099643 | A1* | 4/2018 | Golsch | B60R 25/2018 |
| 2018/0118163 | A1* | 5/2018 | Murakami | B60R 25/01 |
| 2018/0184268 | A1* | 6/2018 | Stitt | H04W 4/80 |
| 2018/0186332 | A1* | 7/2018 | Bocca | H04W 12/08 |
| 2018/0208155 | A1* | 7/2018 | Beyer | B60R 25/245 |
| 2018/0265040 | A1* | 9/2018 | Nowottnick | B60R 25/04 |
| 2018/0276923 | A1* | 9/2018 | Hayashi | G06F 21/35 |
| 2018/0276925 | A1* | 9/2018 | Hayashi | H04W 4/48 |
| 2018/0276926 | A1* | 9/2018 | Hayashi | B60R 25/245 |
| 2018/0288092 | A1* | 10/2018 | Linsky | H04L 9/3242 |
| 2018/0292522 | A1* | 10/2018 | Cavendish | G01S 13/534 |
| 2019/0016301 | A1* | 1/2019 | Merkel | G06K 9/00302 |
| 2019/0077370 | A1* | 3/2019 | Emmerling | B60R 25/04 |
| 2019/0111891 | A1* | 4/2019 | Weghaus | G01S 5/0284 |
| 2019/0114857 | A1* | 4/2019 | Gustin | B60R 25/246 |
| 2019/0161058 | A1* | 5/2019 | Lin | B60R 25/24 |
| 2019/0227539 | A1* | 7/2019 | Golgiri | H04W 4/80 |
| 2019/0230471 | A1* | 7/2019 | Golgiri | G01S 5/00 |
| 2019/0232917 | A1* | 8/2019 | Meng | B60R 25/33 |
| 2019/0304226 | A1* | 10/2019 | Golsch | G07C 9/00309 |
| 2019/0351870 | A1* | 11/2019 | Fricke | B60R 25/209 |
| 2020/0028875 | A1* | 1/2020 | Rogel | H04L 63/1466 |
| 2020/0062219 | A1* | 2/2020 | Stef | B60R 25/30 |
| 2020/0128354 | A1* | 4/2020 | Smith | H04W 64/00 |

OTHER PUBLICATIONS

Decawave, *Automotive Security: Why UWB Measures up—EECatalogue* (US), Retrieved from https://www.decawave.com/news/current-news/automotive-security-why-uwb-measures-eecatalogue-us on Oct. 18, 2017, 4 pages.

* cited by examiner

MOBILE DEVICE RELAY ATTACK DETECTION AND POWER MANAGEMENT FOR VEHICLES

TECHNICAL FIELD

The present disclosure generally relates to vehicles and, more specifically, to mobile device relay attack detection and power management for vehicles.

BACKGROUND

Typically, keys are utilized to unlock doors of a vehicle and to activate an engine of the vehicle. Traditionally, mechanical keys have been utilized to unlock and/or open vehicle doors and to activate ignition of vehicle engines. For instance, a mechanical key is inserted into a keyhole and rotated to unlock a door and/or to start an engine. Recently, mobile devices (e.g., key fobs, phones-as-keys) have been utilized to unlock vehicle doors and to activate vehicle engines. For instance, key fobs and phones-as-keys wirelessly communicate with vehicles to unlock and/or open vehicle doors and/or to activate ignition of engines.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for mobile device relay attack detection and power management for vehicles. An example disclosed vehicle includes a first module for first protocol communication, a second module for second protocol communication, and a controller. The controller is to determine a first distance to a mobile device utilizing a signal strength of the first protocol communication and determine, upon receiving an entry request, a second distance to the mobile device utilizing a time-of-flight of the second protocol communication. The controller also is to prevent entry when the second distance does not match the first distance.

In some examples, the controller detects a relay attack on communication with the mobile device in response to determining that the second distance does not match the first distance.

In some examples, the first protocol communication is Bluetooth® low-energy communication and the second protocol communication is Wi-Fi® communication. In some examples, the first protocol communication is Low Power 900 MHz Wi-Fi® (802.11ah) communication and the second protocol communication is high frequency 60 GHz Wi-Fi® communication.

In some examples, the second distance determined based on the second protocol communication has a smaller margin-of-error than the first distance determined based on the first protocol communication. In such examples, the first protocol communication consumes less energy than the second protocol communication. In some examples, the first distance corresponds to a first range, the first range is determined based on the first distance and a first margin-of-error, the second distance corresponds to a second range that is determined based on the second distance and a second margin-of-error, and the controller determines that the second distance matches the first distance when the second range at least partially overlaps with the first range.

In some examples, the controller receives the entry request after the mobile device is within a threshold approach distance of the vehicle. In such examples, the entry request includes at least one of a passive entry request and a passive start request. Some examples further include a door handle and a handle sensor. In such examples, the controller is to receive the entry request from the handle sensor when the handle sensor detects that the door handle is engaged. Some examples further include a cabin and doors. In such examples, the controller prevents entry into the cabin by maintaining a locked state of the doors.

Some examples further include an engine and an ignition switch for receiving an ignition request for the engine. In such examples, the controller is to initiate the second protocol communication between the second module and the mobile device responsive to receiving the ignition request, determine the second distance utilizing the time-of-flight of the second protocol communication with the mobile device, and prevent ignition of the engine when the second distance does not match the first distance.

In some examples, the controller initiates the second protocol communication between the second module and the mobile device in response to receiving the entry request.

In some examples, the time-of-flight corresponds to an amount of time for the second module to receive a first signal of the second protocol communication from the mobile device and the mobile device to receive a return signal of the second protocol communication from the second module. In some examples, the controller is configured to send and receive a series of signals of the second protocol communication via the first module, identify start and end pulses for each of the signals, and determine the time-of-flight for the second protocol communication based on the start and end pulses. In some examples, to increase a time resolution of the time-of-flight, the controller is configured to stitch together a plurality of round trip signals between the second module and the mobile device.

Some examples further include a third module for low-frequency communication. In such examples, the controller is configured to determine a third distance to the mobile device based on the low-frequency communication and further prevent entry when the second distance does not match the third distance.

An example disclosed method includes determining, via a processor, a first distance between a vehicle and a mobile device based on a signal strength of first protocol communication and determining, upon receipt of an entry request, a second distance between the vehicle and the mobile device based on a time-of-flight of second protocol communication. The example disclosed method also includes preventing, via the processor, entry into a vehicle cabin when the second distance does not match the first distance.

Some examples further include initiating the second protocol communication between a communication module of the vehicle and the mobile device in response to receiving the entry request.

An example disclosed system includes a mobile device and a vehicle including a controller. The controller is to determine a first distance between the vehicle and the mobile device utilizing a signal strength of first protocol communication and determine, upon receiving an entry request, a second distance between the vehicle and the mobile device utilizing a time-of-flight of second protocol communication.

The controller also is to prevent entry when the second distance does not match the first distance.

In some examples, the mobile device is a key fob or a phone-as-a-key. In some examples, the mobile device is configured to determine, responsive to the entry request, whether the second protocol communication is activated for the mobile device and activate the second protocol communication in response to determining that the second protocol communication is not activated.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
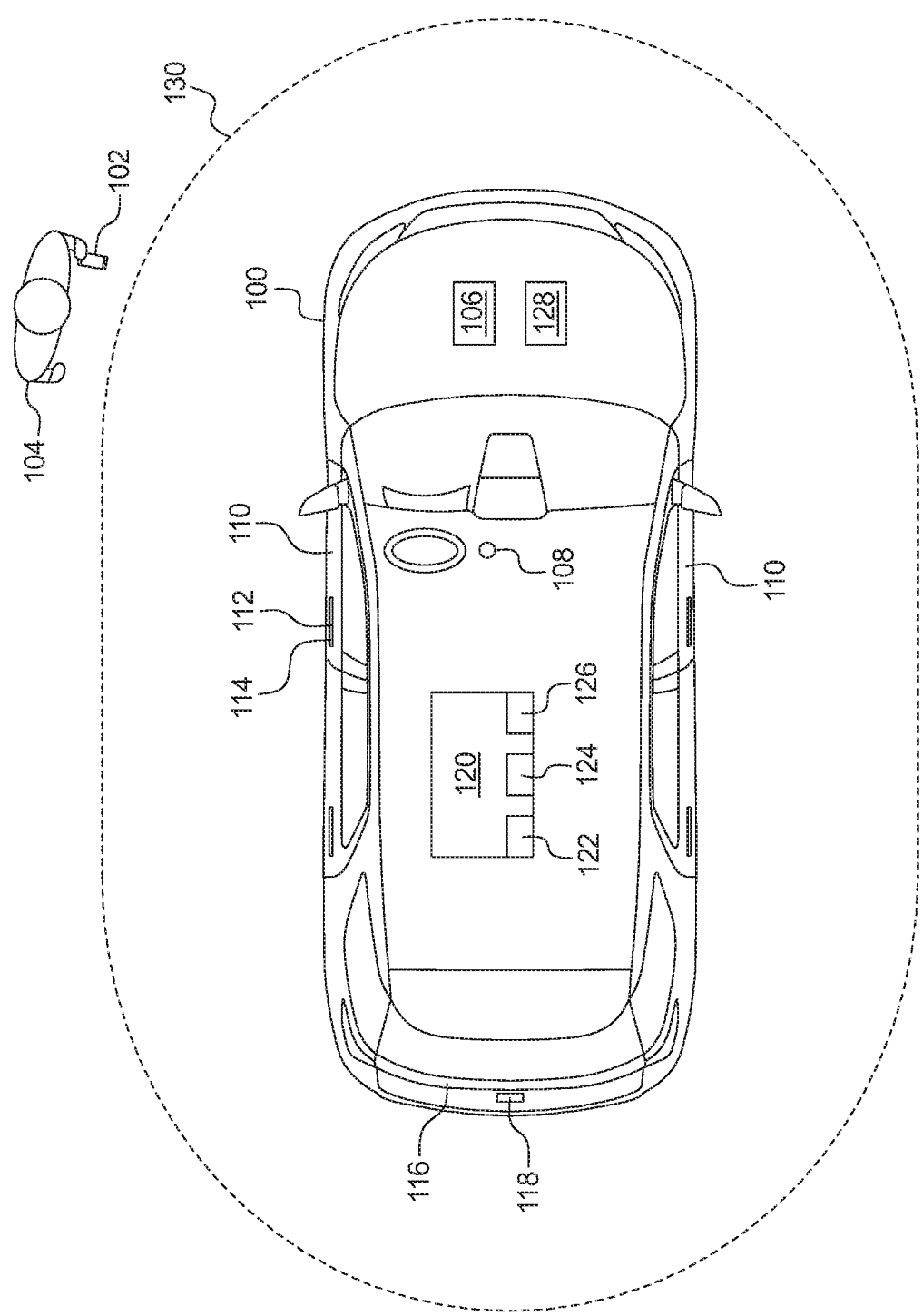
FIG. 1 illustrates an example vehicle and an example mobile device in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, keys are utilized to unlock doors of a vehicle and to activate an engine of the vehicle. Traditionally, mechanical keys have been utilized to unlock and/or open vehicle doors and to activate ignition of vehicle engines. For instance, a mechanical key is inserted into a keyhole and rotated to unlock a door and/or to start an engine. Mobile devices (e.g., key fobs, phones-as-keys) also have been utilized to unlock vehicle doors and to activate vehicle engines. For instance, key fobs and phones-as-keys wirelessly communicate with vehicles to unlock and/or open vehicle doors and/or to activate ignition of engines. In such instances, vehicles perform vehicle functions (e.g., unlock and/or open doors, start an engine) in response to (i) receiving a request from the user and (ii) detecting that a mobile device is near the vehicle. Recently, criminals have identified methods to perform relay attacks on communication between mobile devices and vehicles that potentially trick a vehicle into performing a vehicle function by making it appear that the mobile device is closer to the vehicle than it actually is. For instance, a relay attack may be performed by a device that (1) intercepts types of communication signals (e.g., Bluetooth® low-energy communication signals, low frequency communication signals) sent from a mobile device to a vehicle and (2) amplifies the intercepted communication signals to make the mobile device appear closer to the vehicle than it actually is.

Example methods and apparatus disclosed herein include a system that detects attempted relay attacks on communication between a mobile device (e.g., a key fob, a phone-as-a-key) and a vehicle and prevents access to a vehicle cabin and/or ignition of a vehicle engine upon detection of an attempted relay attack. Examples disclosed herein utilize Bluetooth® low-energy (BLE) communication and Wi-Fi® communication to detect a distance between a vehicle and a mobile device communicatively coupled to the vehicle. A controller determines a first calculated distance based upon a signal strength (e.g., a received signal strength indicator) of the BLE communication between the mobile device and the vehicle. Further, the controller determines a second calculated distance based upon a time-of-flight of the Wi-Fi® communication between the mobile device and the vehicle.

In some examples, the controller initiates the Wi-Fi® communication in response to receiving of a cabin entry request (e.g., via a passive entry signal, a door handle sensor, a liftgate sensor, crossing the threshold of an approach detection zone, etc.) and/or an engine ignition request (e.g., via a passive start signal, etc.). The controller initiates the Wi-Fi® communication upon receipt of a cabin entry request, an engine ignition request, and/or remote park-assist request, because calculating the distance based upon time-of-flight of Wi-Fi® communication is more accurate than calculating the distance based upon a signal strength of BLE® communication. Further, Wi-Fi® communication consumes more energy than BLE® communication. Thus, to conserve energy, the Wi-Fi® communication is initiated only upon receipt of a cabin entry request and/or an engine ignition request. Further, low-frequency (LF) communication may be further utilized to predict the distance between the mobile device and the vehicle. If the calculated distances match, the controller does not detect a relay attack and, thus, enables a cabin entry request and/or an engine ignition request. If the calculated distances do not match, the controller detects a relay attack and, thus, prevents cabin entry and/or engine ignition.

Further, in some examples, the controller initiates the Wi-Fi® communication in response to detecting that the mobile device of the user is approaching the vehicle. For example, Wi-Fi communication is activated after a key fob detects an LF signal ping from the vehicle. In some examples, the LF signal ping normally happens when the key fob is about 3 meters to the vehicle. Activating Wi-Fi communication before the user requests entry at the door of vehicle decreases latency of the passive entry action (e.g., the user does not need to wait for the Wi-Fi communication to initiate upon approaching the door to complete action because the Wi-Fi communication has already been initiated). In other examples, Wi-Fi communication is activated when the vehicle detects a phone-as-a-key is approaching the vehicle based upon a received signal strength indicator (RSSI) of BLE communication. In such examples, activating Wi-Fi communication before the user requests entry at the door of vehicle decreases latency of the passive entry action.

Further, activating Wi-Fi communication to determine the location of the phone-as-the-key of the user enables the vehicle to determine whether and when to activate welcome lighting for the user, because determining a distance based upon a time-of-flight of Wi-Fi communication is more accurate than doing so based upon RSSI of BLE communication.

Further, in some examples disclosed herein the controller initiates the Wi-Fi® communication in response to receiving a remote-park assist request from the mobile device of the user. In such examples, Wi-Fi communication is activated to determine the location of the mobile device of the user for remote-park assist, because determining a distance based upon a time-of-flight of Wi-Fi communication is more accurate than doing so based upon RSSI of BLE communication.

As used herein, a "key fob" refers to a dedicated electronic mobile device that wirelessly communicates with a vehicle to unlock and/or lock one or more vehicle doors, open and/or close one or more of the vehicle doors, activate an engine of the vehicle, and/or initiate other function(s) of the vehicle. In some examples, a user of a vehicle utilizes a mobile device that functions as a phone-as-a-key for wireless communication with the vehicle. As used herein, a "phone-as-a-key" refers to a mobile device (e.g., a smart phone, a wearable, a smart watch, a tablet, etc.) that includes hardware and/or software to function as a key fob.

As used herein, "passive entry" and "passive-entry" refer to a system of a vehicle that unlock(s) and/or open(s) one or more doors of the vehicle upon detecting that a key fob and/or a phone-as-a-key is proximate to and/or approaching a door of the vehicle. For example, some passive entry systems trigger a door for opening in response to detecting a key fob and/or a phone-as-a-key such that the door unlocks upon detecting that a user has touched a handle of the door. As used herein, "passive start" and "passive-start" refer to a system of a vehicle that activates ignition of an engine of the vehicle upon detecting that a key fob and/or a phone-as-a-key is within a cabin of the vehicle (e.g., such that drive-away is enabled). For example, some passive start systems trigger an engine for ignition in response to detecting a key fob and/or a phone-as-a-key such that the ignition of the engine is started when an ignition button within the cabin of the vehicle is pressed. As used herein, "passive entry passive start," "passive-entry passive-start" and "PEPS" refer to a system of vehicle that is configured to perform passive entry and/or passive start for the vehicle.

As used herein, "remote parking," "vehicle remote park-assist," "remote park-assist," and "RePA" refer to a remote initiating motive functions of the vehicle without direct steering or velocity input from a driver to autonomously park the vehicle into a parking spot while the driver is located outside of the vehicle. For example, a remote park assist-system of an autonomy unit initiates the motive functions of the vehicle upon initiation from a driver via a remote device to remotely park the vehicle into a parking spot.

Turning to the figures, FIG. 1 illustrates an example vehicle 100 and an example mobile device 102 of a user 104 in accordance with the teachings herein. For example, the mobile device 102 of the user 104 includes a key fob and/or a phone-as-a-key that is configured to communicate with and/or initiate functions of the vehicle 100. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 includes an engine 106 and an ignition switch 108. For example, the engine 106 includes an internal combustion engine, an electric motor, a hybrid engine and/or any other power source that propels movement of the vehicle 100. Further, the ignition switch 108 enables the user 104 and/or another operator of the vehicle 100 to operate the engine 106, a battery, and/or electronic accessories of the vehicle 100. For example, the ignition switch 108 includes an on-position, a start position, and an off-position. In some examples, the ignition switch 108 is a rotary switch and/or a pushbutton that transitions between the ignition switch positions (e.g., the on-position, the start position, the off-position, the accessory position). Further, in some examples, the vehicle 100 includes an ignition switch sensor that detects a position of the ignition switch (e.g., the on-position, the start position, the off-position).

Further, the vehicle 100 of the illustrated example includes one or more doors 110, a door handle 112 (also referred to as a handle), and a handle sensor 114 (also referred to as a door handle sensor). For example, the doors 110 enable the user 104 to enter and/or exit from a cabin of the vehicle 100. The door handle 112 enables the user 104 to open and/or close the corresponding one of the doors 110. For example, the user 104 grasps and/or otherwise engages the one of the doors 110 to open and/or close one of the doors 110. Further, the handle sensor 114 detects when the door handle 112 is engaged (e.g., by the user 104). For example, the handle sensor 114 is a capacitive sensor and/or any other sensor that is configured to detect when the door handle 112 is engaged. In some examples, the vehicle 100 includes a passive entry system in which one or more of the doors 110 is unlocked upon the handle sensor 114 detecting that the door handle 112 has been grasped and/or otherwise engaged (e.g., by the user 104) and the mobile device 104 of the user 104 is determined to be near the vehicle 100.

In the illustrated example, the vehicle 100 also includes a liftgate 116 and a liftgate sensor 118. For example, the liftgate 116 is a door or panel that opens upwardly to provide access to a cargo compartment located at a rear of the vehicle 100. The liftgate sensor 118 is configured to detect a request from the user 104 to open the liftgate 116 via a hands-free liftgate system. For example, the liftgate sensor 118 (e.g., a capacitive sensor, a kick sensor, etc.) is positioned on and/or next to the liftgate 116 to monitor an activation area near the liftgate 116. When the user 104 extends at least a portion of his or her leg (e.g., a foot) into the activation area, the liftgate sensor 118 detects a request to open the liftgate 116 via the hands-free liftgate system.

The vehicle 100 also includes a communication module 120. In some examples, the communication module 120 includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. In such examples, the communication module 120 also includes hardware (e.g., processors, memory, storage, antenna, etc.) and software to control the wired or wireless network interfaces. For example, the communication module 120 includes one or more communication controllers for cellular networks, such as Global System for Mobile Communications (GSM), Universal Mobile Telecommunications System (UMTS), Long Term Evolution (LTE), and Code Division Multiple Access (CDMA).

In the illustrated example, the communication module 120 includes hardware and firmware to establish a wireless connection with the mobile device 102 of the user 104. For example, the communication module 120 includes communication modules that enable wireless communication with the mobile device 102 when the mobile device 102 is proximate to the vehicle 100. For example, the communication module 120 includes a LF communication module 122 (also referred to as a low-frequency communication module, a LF module, a low-frequency module), a BLE communication module 124 (also referred to as a Bluetooth® low-energy communication module, a BLE module, a Bluetooth® low-energy module), and a Wi-Fi communication module 126 (also referred to as a Wi-Fi module). The LF communication module 122 is configured for low-frequency communication. For example, when the mobile device 102 is a key fob, the LF communication module 122 communicates with the mobile device 102 via low-frequency signals. The BLE communication module 124 is configured for Bluetooth® and/or BLE protocol communication. That is, the BLE communication module 124 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Further, the Wi-Fi communication module 126 is configured for Wi-Fi® protocol communication. For example, the Wi-Fi communication module 126 implements communication protocol(s) in accordance with IEEE 802.11 a/b/g/n/ac and/or other local area wireless network communication protocols. Additionally or alternatively, the communication module 120 is configured to wirelessly communicate via Near Field Communication (NFC), UWB (Ultra-Wide Band), and/or any other short-range and/or local wireless communication protocol that enables the communication module 120 to communicatively couple to the mobile device 102 of the user 104.

As illustrated in FIG. 1, the vehicle 100 also includes a signal controller 128. For example, the signal controller 128 determines whether a relay attack is being attempted on the vehicle 100 based on a request signal received by the communication module 120 of the vehicle 100. If the signal controller 128 detects that a relay attack is being attempted, the signal controller 128 prevents the requested vehicle function (e.g., entry into a cabin of the vehicle 100, starting the engine 106, etc.) from being performed.

In operation, the signal controller 128 is configured to receive signals from the mobile device 102 when the mobile device 102 is authenticated and/or paired with the vehicle 100. For example, prior to communicating with the mobile device 102, the communication module 120 may authenticate the mobile device 102 for communication with the communication module 120. That is, the communication module 120 may pair the mobile device 102 with the communication module 120 of the vehicle 100. To authenticate communication between the communication module 120 and the mobile device 102, the communication module 120 intermittently broadcasts a beacon (e.g., a BLE beacon). When the mobile device 102 is within a broadcast range of the communication module 120, the mobile device 102 receives the beacon and subsequently sends an authentication key code transmission. The communication module 120 authenticates the mobile device 102 for communication with the communication module 120 upon receiving the authentication key from the mobile device 102. In other examples, the mobile device 102 broadcasts a beacon and the communication module 120 subsequently receives the beacon to authenticate communication between the mobile device 102 and the communication module 120.

Upon being paired, the mobile device 102 communicates with the communication module 120 when the mobile device 102 is within a threshold range (e.g., a broadcast range) of the vehicle 100 via a first communication protocol. That is, the communication module 120 receives a first protocol communication from the mobile device 102 when the mobile device 102 is within the range of the vehicle 100. For example, the first communication protocol is BLE communication protocol, and the first protocol communication is BLE communication. In other examples, the first communication protocol is a Low Power 900 MHz Wi-Fi (802.11ah) communication protocol, and the first protocol communication is Low Power 900 MHz Wi-Fi (802.11ah) communication.

The signal controller 128 of the illustrated example determines a first distance between the mobile device 102 and the vehicle 100 based upon the BLE communication between the mobile device 102 and the BLE communication module 124 of the vehicle 100. For example, the signal controller 128 utilizes a signal strength (e.g., a received signal strength indicator (RSSI)) of the BLE communication to calculate the first distance between the vehicle 100 and the mobile device 102. Additionally or alternatively, the signal controller 128 determines the first distance to the mobile device 102 and/or localizes the mobile device 102 (i.e., identifies a location of the mobile device 102 relative the vehicle 100) based upon RSSIs of the BLE communication between the mobile device 102 and multiple communication modules (e.g., including the communication module 120) of the vehicle 100. For example, the signal controller 128 utilizes triangulation and/or trilateration to localize the mobile device 102 based upon the RSSIs of BLE communication between the mobile device 102 and the plurality of communication modules. When the signal controller 128 identifies a distance to and/or localizes the mobile device 102 based upon RSSIs of the BLE communication, the identified distance to and/or location of the mobile device 102 may have a margin-of-error of about between 1 meter and 2 meters when the mobile device 102 is about 3.0 meters from the vehicle 100.

In the illustrated example, the signal controller 128 is configured to determine that the user 104 is approaching the vehicle 100 in response to detecting, via the RSSIs of the BLE and/or LF communication, that the mobile device 102 is within a threshold range 130 of the vehicle 100. Further, the signal controller 128 is configured to receive a passive entry request (e.g., via a body control module 612 of FIG. 6) upon the handle sensor 114 detecting that the door handle 112 is engaged (e.g., by the user 104) and/or the liftgate sensor 118 detecting a request to activate the liftgate 116. In such examples, the signal controller 128 attempts to verify the location of the user 104 relative to the vehicle 100 by localizing the mobile device 102 via RSSI of BLE and/or LF communication.

In the illustrated example, the signal controller 128 also is configured to receive a passive start request upon determining, via the RSSIs of the BLE and/or LF communication, that the mobile device 102 is within a cabin of the vehicle 100. The signal controller 128 also is configured to receive the passive start request in response to the ignition switch 108 receiving an ignition request (e.g., from the user 104).

Upon receiving the ignition request, the signal controller 128 attempts to verify that the user 104 is located within the cabin of the vehicle 100 by localizing the mobile device 102 via RSSI of BLE and/or LF communication.

Further, upon detecting that the user 104 has entered the threshold range 130, the signal controller 128 initiates second protocol communication (e.g., Wi-Fi communication) between the communication module 120 of the vehicle 100 and the mobile device. That is, the signal controller 128 initiates Wi-Fi communication between the communication module 120 of the vehicle 100 in response to detecting that the user 104 is approaching the vehicle 100. In some examples, the mobile device 102 is configured to determine whether Wi-Fi communication is activated for the mobile device 102 upon the user 104 entering the threshold range 130. In response to determining that Wi-Fi communication is not activated, Wi-Fi communication is activated by the mobile device 102.

The signal controller 128 also determines a second distance between the mobile device 102 and the vehicle 100 based upon the Wi-Fi communication between the mobile device 102 and the Wi-Fi communication module 126 of the vehicle 100. For example, the signal controller 128 utilizes time-of-flight of the Wi-Fi communication to calculate the second distance between the vehicle 100 and the mobile device 102. Additionally or alternatively, the signal controller 128 determines the second distance to the mobile device 102 and/or localizes the mobile device 102 based upon times-of-flight of the Wi-Fi communication between the mobile device 102 and multiple communication modules of the vehicle 100. When the signal controller 128 identifies a distance to and/or localizes the mobile device 102 based upon times-of-flight of the Wi-Fi communication, the identified distance to and/or location of the mobile device 102 may have a margin-of-error that is significantly less than the margins of error associated with RSSIs of BLE communication. That is, while BLE communication consumes less energy than Wi-Fi communication, the distance determined based upon time-of-flight of Wi-Fi communication has a smaller margin-of-error than the distance determined based upon RSSI of BLE communication. In turn, by activating Wi-Fi communication only upon receiving a request signal, the vehicle 100 is able to reduce an amount of energy consumed required to determine a distance to the mobile device 102 with a small margin-of-error.

Further, in some examples (e.g., in which the mobile device 102 is a key fob), the signal controller 128 determines a third distance between the mobile device 102 and the vehicle 100 based upon an RSSI of the LF communication between the mobile device 102 and the LF communication module 122 of the vehicle 100. Additionally or alternatively, the signal controller 128 determines the third distance to the mobile device 102 and/or localizes the mobile device 102 based upon RSSIs of the LF communication between the mobile device 102 and multiple communication modules of the vehicle 100 (e.g., utilizing triangulation and/or trilateration). When the signal controller 128 identifies a distance to and/or localizes the mobile device 102 based upon RSSIs of the LF communication, the identified distance to and/or location of the mobile device 102 may have a margin-of-error of about 0.5 meters when the mobile device 102 is about 3.0 meters from the vehicle 100.

Figure 2:
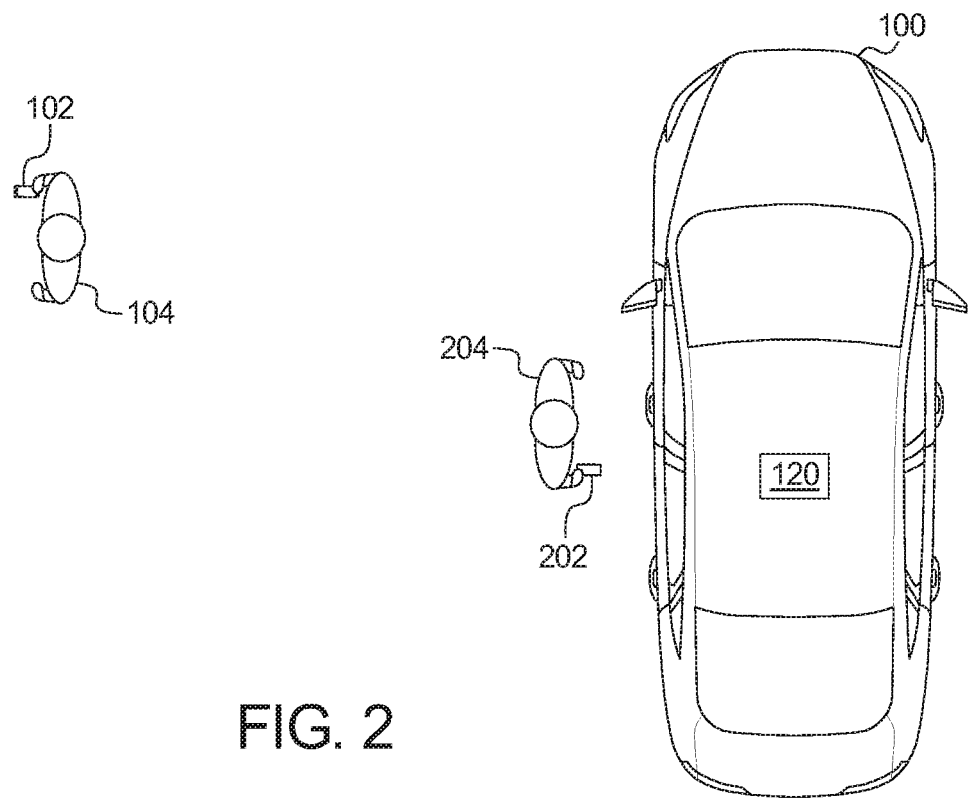
FIG. 2 illustrates the vehicle and the mobile device of FIG. 1 when a relay attack is being attempted.
Figure 3:
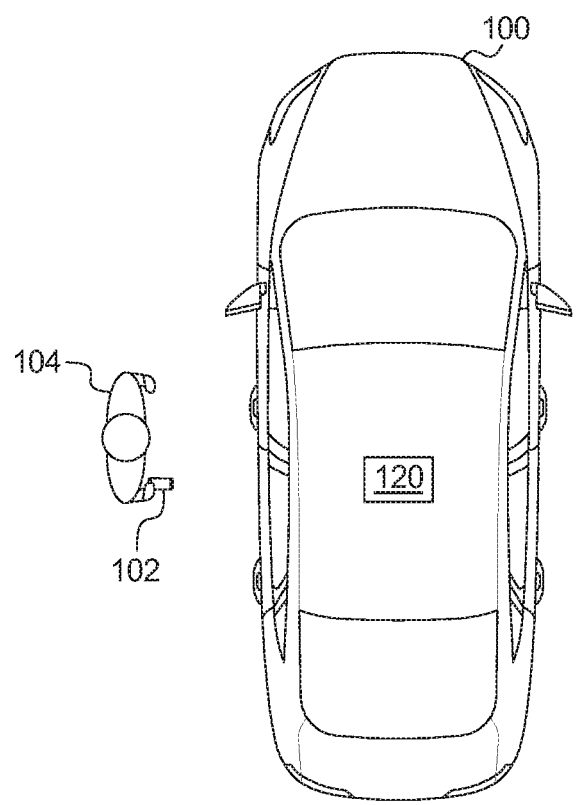
FIG. 3 illustrates the vehicle and the mobile device of FIG. 1 when no relay attack is being attempted.

The signal controller 128 of the illustrated example determines whether a relay attack is being attempted on communication with the mobile device 102 by comparing the distances calculated based upon the different communication protocols. FIG. 2 illustrates the vehicle 100 and the mobile device 102 when a relay attack is being attempted, and FIG. 3 illustrates the vehicle 100 and the mobile device 102 when no relay attack is being attempted. For example, a relay attack is performed by a device 202 of an attacker 204 that (1) intercepts BLE and/or LF communication signals sent from the vehicle 100 and (2) amplifies the intercepted BLE and/or LF communication signals such that the RSSIs of the BLE and/or LF communication signals are increased when received by the mobile device 102. In turn, when the mobile device 102 sends a return signal with the RSSIs back to the vehicle 100, the vehicle 100 believes that the mobile device 102 is closer to the vehicle 100 than is actually true because of the amplified RSSIs of the intercepted BLE and/or LF communication signals.

The time-of-flight of a signal is identified based upon how long it takes to send and receive a signal. That is, the time-of-flight of a signal is not manipulated by such amplification of a signal. In turn, the signal controller 128 of the illustrated example determines whether there is a relay attack by comparing the second distance calculated based upon time-of-flight of Wi-Fi communication to the first distance calculated based upon RSSI of BLE communication and/or the third distance calculated based upon RSSI of LF communication.

For example, the signal controller 128 detects that a relay attack is occurring (as depicted in FIG. 2) if the second distance does not match the first distance (and the third distance, if calculated). Further, the signal controller 128 detects that a relay attack is not occurring (e.g., as depicted in FIG. 3) if the second distance matches the first distance (and the third distance, if calculated). In some examples, to account for the margins-of-error of the different methods for determining the distance between the mobile device 102 and the vehicle 100, the signal controller 128 determines that a relay attack is being attempted if a first range does not at least partially overlap with a second range. In such examples, the first range is determined based on the first distance and the first margin-of-error corresponding with RSSI of BLE communication, and the second range is determined based on the second distance and the second margin-of-error corresponding with time-of-flight of Wi-Fi communication. Additionally or alternatively, if a third range is determined based on the third distance and the third margin-of-error corresponding with RSSI of LF communication, the signal controller 128 determines that a relay attack is being attempted if the third range does not at least partially overlap with the second range. Further, the signal controller 128 determines that a relay attack is not being attempted in response to the second range at least partially overlapping with the first range (or, if calculated, the third range).

In response to detecting that a relay attack is being attempted, the signal controller 128 prevents a vehicle function from being performed that corresponds with the request. For example, if a relay attack is being performed on communication that includes an entry request, the signal controller 128 prevents entry into the cabin of the vehicle 100 by maintaining a locked state of the doors 110 and the liftgate 116. If a relay attack is being performed on communication that includes a passive start request, the signal controller 128 prevents the ignition of the engine 106.

Further, the signal controller 128 of the illustrated example also is configured to receive a request from the user 104. For example, the signal controller 128 is configured to receive a remote park-assist request from the mobile device 102 via the BLE communication. Upon receiving the request, the signal controller 128 initiates Wi-Fi communication between the communication module 120 of the vehicle 100 and the mobile device 102. In some examples, the mobile device 102 is configured to determine whether Wi-Fi communication is activated for the mobile device 102 upon the request being sent. In response to determining that Wi-Fi communication is not activated, Wi-Fi communication is activated by the mobile device 102. Upon initiating the Wi-Fi communication, the signal controller 128 determines a distance between the mobile device 102 and the vehicle 100 based upon a time-of-flight of the Wi-Fi communication. Subsequently the signal controller 128 compares the distance to a threshold distance (e.g., the threshold range 130) corresponding to performance of remote park-assist. In response to determining that the calculated distance is within the threshold range, the signal controller 128 enables the vehicle 100 to perform remote park-assist functions. Otherwise, in response to determining that the calculated distance is not within the threshold range, the signal controller 128 prevents the vehicle 100 to perform remote park-assist functions.

Figure 4:
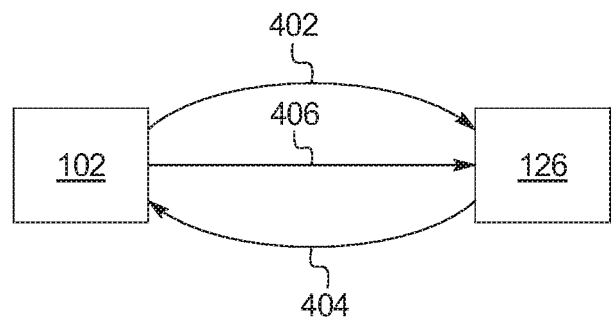
FIG. 4 depicts Wi-Fi communication between the mobile device and the vehicle of FIG. 1.

FIG. 4 depicts Wi-Fi communication between the mobile device 102 and the Wi-Fi communication module 126 of the vehicle 100 that enables a time-of-flight of Wi-Fi communication to be determined. As illustrated in FIG. 4, the signal controller 128 sends and receives a series of signals of Wi-Fi communication via the Wi-Fi communication module 126. The signal controller 128 identifies start and end pulses for each of the signals. Subsequently, the signal controller 128 determines the time-of-flight for the Wi-Fi communication based on the start and end pulses. That is, the time-of-flight corresponds to an amount of time for the Wi-Fi communication module 126 to send or receive a first signal of Wi-Fi communication to or from the mobile device 102 and the mobile device 102 to receive or send a return signal of the Wi-Fi communication from or to the Wi-Fi communication module 126. The signal controller 128 determines a distance to the mobile device 102 by determining how long it takes to send and receive signals to and from the mobile device 102 via Wi-Fi communication.

In the illustrated example, the mobile device 102 sends a first signal 402 to the Wi-Fi communication module 126. For example, the mobile device 102 identifies a start pulse of the first signal 402 and the Wi-Fi communication module 126 identifies an end pulse of the first signal 402 to determine a first signal duration. Subsequently, the Wi-Fi communication module 126 sends a return signal 404 to the mobile device 102. For example, the Wi-Fi communication module 126 identifies a start pulse of the return signal 404 and the mobile device 102 identifies an end pulse of the return signal 404 to determine a second signal duration. The mobile device 102 determines the time-of-flight of the Wi-Fi communication by averaging the first signal duration and the second signal duration together. Further, the mobile device 102 sends another signal 406 to the Wi-Fi communication module 126 to enable the signal controller 128 of the vehicle 100 to receive the time-of-flight of the Wi-Fi communication. In other examples, the Wi-Fi communication module 126 sends the first signal 402 to the mobile device 102 and the mobile device 102 sends the return signal 404 to the Wi-Fi communication module 126 to enable the signal controller 128 to identify the time-of-flight of the Wi-Fi communication. Further, in some examples, the signal controller 128 increases the time resolution of the time-of-flight by stitching together a plurality of round trip signals between the Wi-Fi communication module 126 and the mobile device 102.

Figure 5:
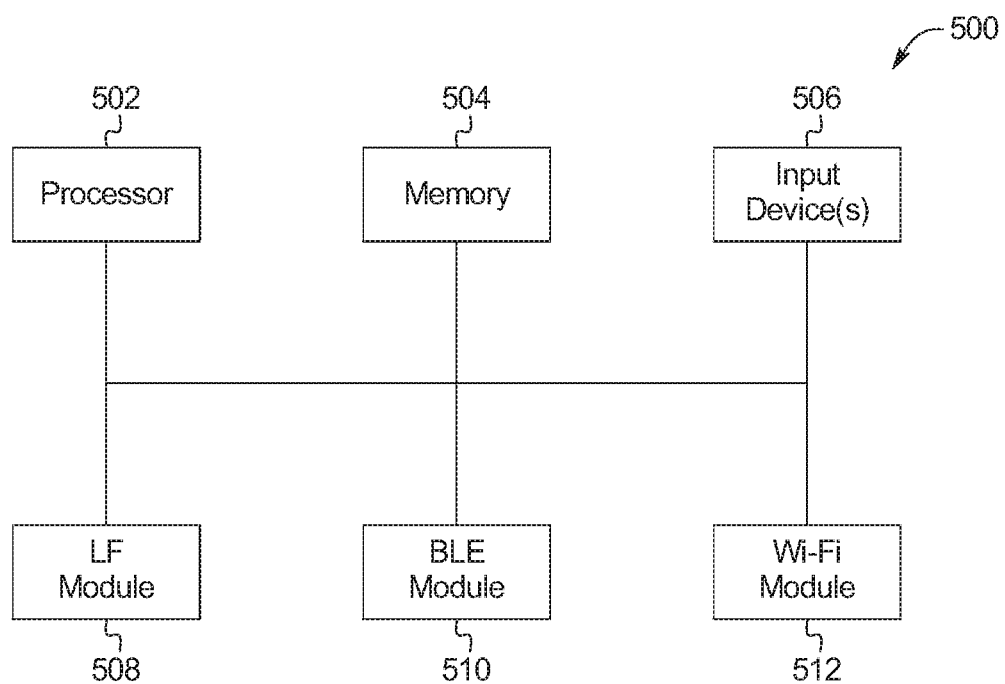
FIG. 5 is a block diagram of electronic components of the mobile device of FIG. 1.

FIG. 5 is a block diagram of electronic components 500 of the mobile device 102. As illustrated in FIG. 5, the electronic components 500 include a processor 502, memory 504, one or more input devices 506, a LF communication module 508 (e.g., when the mobile device 102 is a key fob), a BLE communication module 510, and a Wi-Fi communication module 512.

The processor 502 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 504 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 504 includes multiple kinds of memory, particularly volatile memory and non-volatile memory.

The memory 504 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 504, the computer readable medium, and/or within the processor 502 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The input device(s) 506 enable the user 104 to provide instructions, commands, and/or data. In examples in which the mobile device 102 is a key fob, the input device(s) 506 include a button to unlock the doors 110 of the vehicle 100, a button to lock the doors 110 of the vehicle 100, a button to open the liftgate 116 of the vehicle 100, an emergency alarm button, a button to remote start the engine 106 of the vehicle 100, etc. In examples in which the mobile device 102 is a phone-as-a-key, the input device(s) 506 include a touchscreen and/or one or more buttons to operate the doors 110, the liftgate 116, the engine 106, etc. and/or to activate remote park-assist.

The LF communication module 508 (also referred to as a low-frequency communication module, a LF module, a low-frequency module) is configured for low-frequency communication. For example, the LF communication module 508 includes hardware and firmware to establish a wireless connection with the LF communication module 122 of the vehicle 100 via low-frequency signals when the mobile device 102 is near the vehicle 100.

The BLE communication module 510 (also referred to as a Bluetooth® low-energy communication module, a BLE module, a Bluetooth® low-energy module) is configured for Bluetooth® and/or BLE protocol communication. For example, the BLE communication module 510 includes hardware and firmware to establish a wireless connection with the BLE communication module 124 of the vehicle 100 via Bluetooth® and/or BLE when the mobile device 102 is near the vehicle 100. That is, the BLE communication module 510 implements the Bluetooth® and/or Bluetooth® Low Energy (BLE) protocols.

The Wi-Fi communication module 512 (also referred to as a Wi-Fi module) is configured for Wi-Fi® protocol communication. For example, the Wi-Fi communication module 512 includes hardware and firmware to establish a wireless connection with the Wi-Fi communication module 126 of the vehicle 100 via a protocol in accordance with IEEE 802.11 a/b/g/n/ac and/or other local area wireless network communication protocols when the mobile device 102 is near the vehicle 100.

Additionally or alternatively, the electronic components 500 of the mobile device 102 includes other communication module(s) that are configured to wirelessly communicate via Near Field Communication (NFC), UWB (Ultra-Wide Band), and/or any other short-range and/or local wireless communication protocol that enables the mobile device 102 to communicatively couple to the communication module 120 of the vehicle 100.

Figure 6:
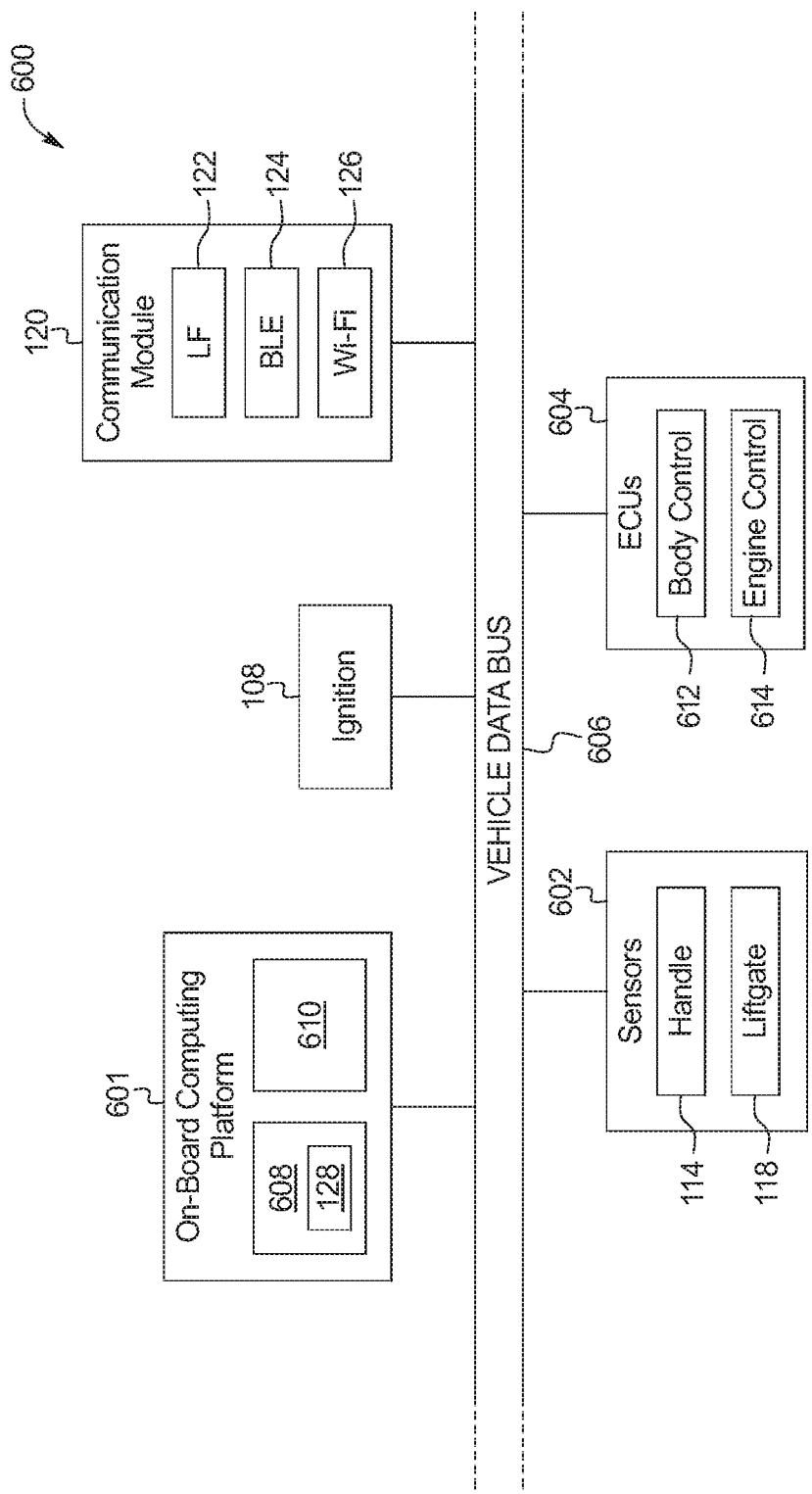
FIG. 6 is a block diagram of electronic components of the vehicle of FIG. 1.

FIG. 6 is a block diagram of electronic components 600 of the vehicle 100. As illustrated in FIG. 6, the electronic components 600 include an on-board computing platform 601, the ignition switch 108, the communication module 120, sensors 602, electronic control units (ECUs) 604, and a vehicle data bus 606.

The on-board computing platform 601 includes a microcontroller unit, controller or processor 608 and memory 610. In some examples, the processor 608 of the on-board computing platform 601 is structured to include the signal controller 128. Alternatively, in some examples, the signal controller 128 is incorporated into another electronic control unit (ECU) with its own processor 608 and memory 610. The processor 608 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 610 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 610 includes multiple kinds of memory, particularly volatile memory and non-volatile memory.

The memory 610 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 610, the computer readable medium, and/or within the processor 608 during execution of the instructions.

The ignition switch 108 of the illustrated example is an input device that enables the user to start the ignition of the engine 106. Further, the communication module 120 of the illustrated example includes the LF communication module 122 that is configured to wirelessly communicate via low-frequency signals, the BLE communication module 124 that is configured to wirelessly communicate in accordance with the BLE protocol, and the Wi-Fi communication module 126 that is configured to wirelessly communicate in accordance with Wi-Fi protocol (e.g., IEEE 802.11 a/b/g/n/ac).

The sensors 602 are arranged in and around the vehicle 100 to monitor properties of the vehicle 100 and/or an environment in which the vehicle 100 is located. One or more of the sensors 602 may be mounted to measure properties around an exterior of the vehicle 100. Additionally or alternatively, one or more of the sensors 602 may be mounted inside a cabin of the vehicle 100 or in a body of the vehicle 100 (e.g., an engine compartment, wheel wells, etc.) to measure properties in an interior of the vehicle 100. For example, the sensors 602 include accelerometers, odometers, tachometers, pitch and yaw sensors, wheel speed sensors, microphones, tire pressure sensors, biometric sensors and/or sensors of any other suitable type. In the illustrated example, the sensors 602 include the handle sensor 114 that detects monitors for engagement of the door handle 112 (e.g., by the user 104) and the liftgate sensor 118 that monitors for requests to open the liftgate 116.

The ECUs 604 monitor and control the subsystems of the vehicle 100. For example, the ECUs 604 are discrete sets of electronics that include their own circuit(s) (e.g., integrated circuits, microprocessors, memory, storage, etc.) and firmware, sensors, actuators, and/or mounting hardware. The ECUs 604 communicate and exchange information via a vehicle data bus (e.g., the vehicle data bus 606). Additionally, the ECUs 604 may communicate properties (e.g., status of the ECUs 604, sensor readings, control state, error and diagnostic codes, etc.) to and/or receive requests from each other. For example, the vehicle 100 may have seventy or more of the ECUs 604 that are positioned in various locations around the vehicle 100 and are communicatively coupled by the vehicle data bus 606.

In the illustrated example, the ECUs 604 include a body control module 612 and an engine control unit 614. The body control module 612 controls one or more subsystems throughout the vehicle 100, such as power windows, power locks, an immobilizer system, power mirrors, etc. For example, the body control module 612 includes circuits that drive one or more of relays (e.g., to control wiper fluid, etc.), brushed direct current (DC) motors (e.g., to control power seats, power locks, power windows, wipers, etc.), stepper motors, LEDs, etc. Further, the engine control unit 614 control(s) operation (e.g., ignition, remote starting, passive starting, etc.) of the engine 106 of the vehicle 100.

The vehicle data bus 606 communicatively couples the ignition switch 108, the communication module 120, the on-board computing platform 601, the sensors 602, and the ECUs 604. In some examples, the vehicle data bus 606 includes one or more data buses. The vehicle data bus 606 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
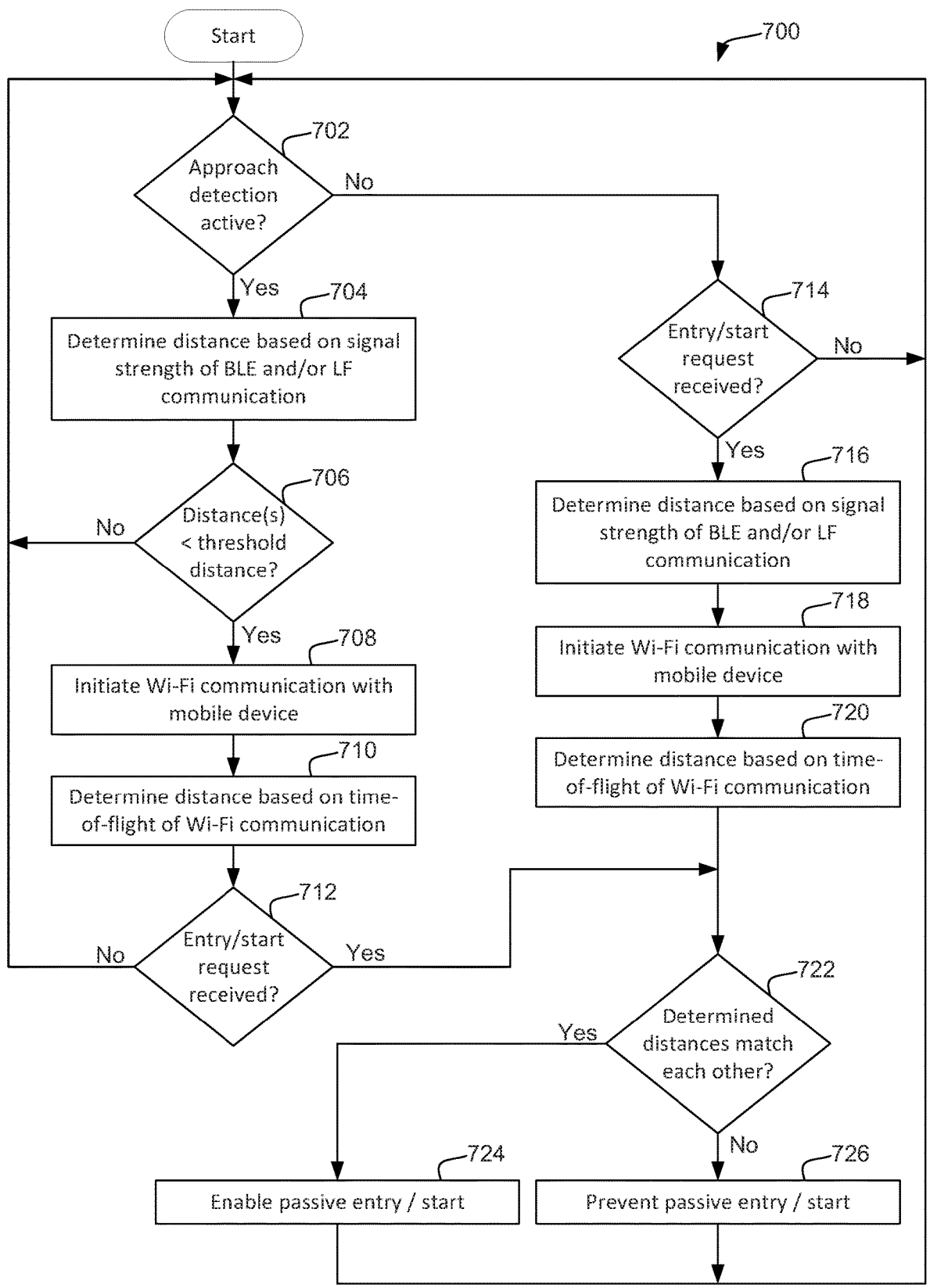
FIG. 7 is a flowchart of a method for vehicles to detect mobile device relay attacks in accordance with the teachings herein.

FIG. 7 is a flowchart of an example method 700 for vehicles to detect mobile device relay attacks and to manage the power of mobile device interactions. The flowchart of FIG. 7 is representative of machine readable instructions that are stored in memory (such as the memory 610 of FIG. 6) and include one or more programs which, when executed by a processor (such as the processor 608 of FIG. 6), cause the vehicle 100 to implement the example signal controller 128 of FIGS. 1 and 6. While the example program is described with reference to the flowchart illustrated in FIG. 7, many other methods of implementing the example signal controller 128 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the signal controller 128 determines whether approach detection is active for the vehicle 100. That is, the signal controller 128 identifies whether the signal controller 128 is monitoring, via RSSI of BLE communication and/or the LF communication, for the user 104 to cross the threshold range 130 of the vehicle 100. In response to the signal controller 128 determining that approach detection is inactive, the method 700 proceeds to block 714. Otherwise, in response to the signal controller 128 determining that approach detection is active, the method 700 proceeds to block 704.

At block 704, the signal controller 128 determines a distance (e.g., a first distance and/or a third distance) that is calculated based on a signal strength of BLE communication and/or LF communication between the vehicle 100 and the mobile device 102.

At block 706, the signal controller 128 determines whether the user 104 is approaching and/or near the vehicle 100 by determining whether the distance(s) determined based upon the BLE communication and/or the LF communication is less than the threshold range 130 of the vehicle 100. In response to the signal controller 128 determining that the user 104 is not within the threshold range 130, the method 700 returns to block 702. Otherwise, in response to the signal controller 128 determining that the user 104 is within the threshold range 130 for approach detecting, the method 700 proceeds to block 708.

At block 708, the signal controller 128 activates the Wi-Fi communication module 126 of the vehicle 100 to initiate Wi-Fi communication between the Wi-Fi communication module 126 of the communication module 120 of the vehicle 100 and the Wi-Fi communication module 512 of the mobile device 102. At block 710, the signal controller 128 determines a distance (e.g., a second distance) based on a time-of-flight of the Wi-Fi communication between the vehicle 100 and the mobile device 102.

In some examples, upon determining the distance based on the time-of-flight of the Wi-Fi communication, the signal controller 128 determines whether the calculated distances match each other. That is, the signal controller 128 compares the first distance that was calculated based on the BLE communication and/or the third distance that was calculated based on the LF communication to the second distance that was calculated based on the Wi-Fi communication. In some such examples, the signal controller 128 activates welcome lighting of the vehicle 100 if the calculated distances match each other and are less than the threshold distance. Otherwise, if the calculated distances do not match each other, the signal controller 128 does not activate the welcome lighting.

At block 712, the signal controller 128 determines whether a passive entry request and/or a passive start request was received. For example, the signal controller 128 may receive a passive entry request via the body control module 612 from the handle sensor 114, the liftgate sensor 118, the ignition switch 108, etc. In response to the signal controller 128 determining that a passive entry request and/or a passive start request has been received, the method proceeds to block 722. Otherwise, in response to the signal controller 128 determining that a passive entry request or passive start request has not been received, the method returns to block 702.

Returning to block 714, the signal controller 128 also determines whether a passive entry request and/or a passive start request was received upon identifying that approach detection for the vehicle 100 is inactive. In response to the signal controller 128 determining that a passive entry request and/or a passive start request has been received, the method proceeds to block 716. Otherwise, in response to the signal controller 128 determining that a passive entry request or passive start request has not been received, the method returns to block 702.

At block 716, the signal controller 128 determines a distance (e.g., a first distance and/or third distance) that is calculated based on a signal strength of BLE communication and/or LF communication between the vehicle 100 and the mobile device 102 that is utilized to initiate remote park-assist.

At block 718, the signal controller 128 activates the Wi-Fi communication module 126 of the vehicle 100 to initiate Wi-Fi communication between the Wi-Fi communication module 126 of the communication module 120 of the vehicle 100 and the Wi-Fi communication module 512 of the mobile device 102. At block 720, the signal controller 128 determines a distance (e.g., a second distance) based on a time-of-flight of the Wi-Fi communication between the vehicle 100 and the mobile device 102.

At block 722, the signal controller 128 determines whether the calculated distances to the mobile device 102 match each other. That is, the signal controller 128 compares the first distance that was calculated based on the BLE communication and/or the third distance that was calculated based on the LF communication to the second distance that was calculated based on the Wi-Fi communication. For example, the first distance corresponds to a range (e.g., a first range) that is determined based on the first distance and a margin-of-error (e.g., a first margin-of-error) that corresponds to determining a distance based upon an RSSI of BLE communication, the second distance corresponds to a range (e.g., a second range) that is determined based on the second distance and a margin-of-error (e.g., a second margin-of-error) that corresponds to determining a distance based upon a time-of-flight and Wi-Fi communication, the third distance corresponds to a range (e.g., a third range) that is determined based on the third distance and a margin-of-error (e.g., a third margin-of-error) that corresponds to determining a distance based upon an RSSI of LF communication. In such examples, the signal controller 128 determines that the calculated distances match if the second range overlaps with the first range and/or the third range.

In response to the signal controller 128 determining that the distances match each other, the signal controller 128 determines that a relay attack is not being performed on communication with the vehicle 100. In turn, the method 700 proceeds to block 724 at which the signal controller 128 enables entry into the cabin and/or ignition of the engine 106 that correspond to the request triggering the Wi-Fi communication. Otherwise, in response to the signal controller 128 determining that the distances do not match each other, the signal controller 128 determines that a relay attack is being performed on communication with the vehicle 100. In turn, the method 700 proceeds to block 726 at which the signal controller 128 prevents entry into the cabin and/or ignition of the engine 106 that correspond to the request triggering the Wi-Fi communication.

Figure 8:
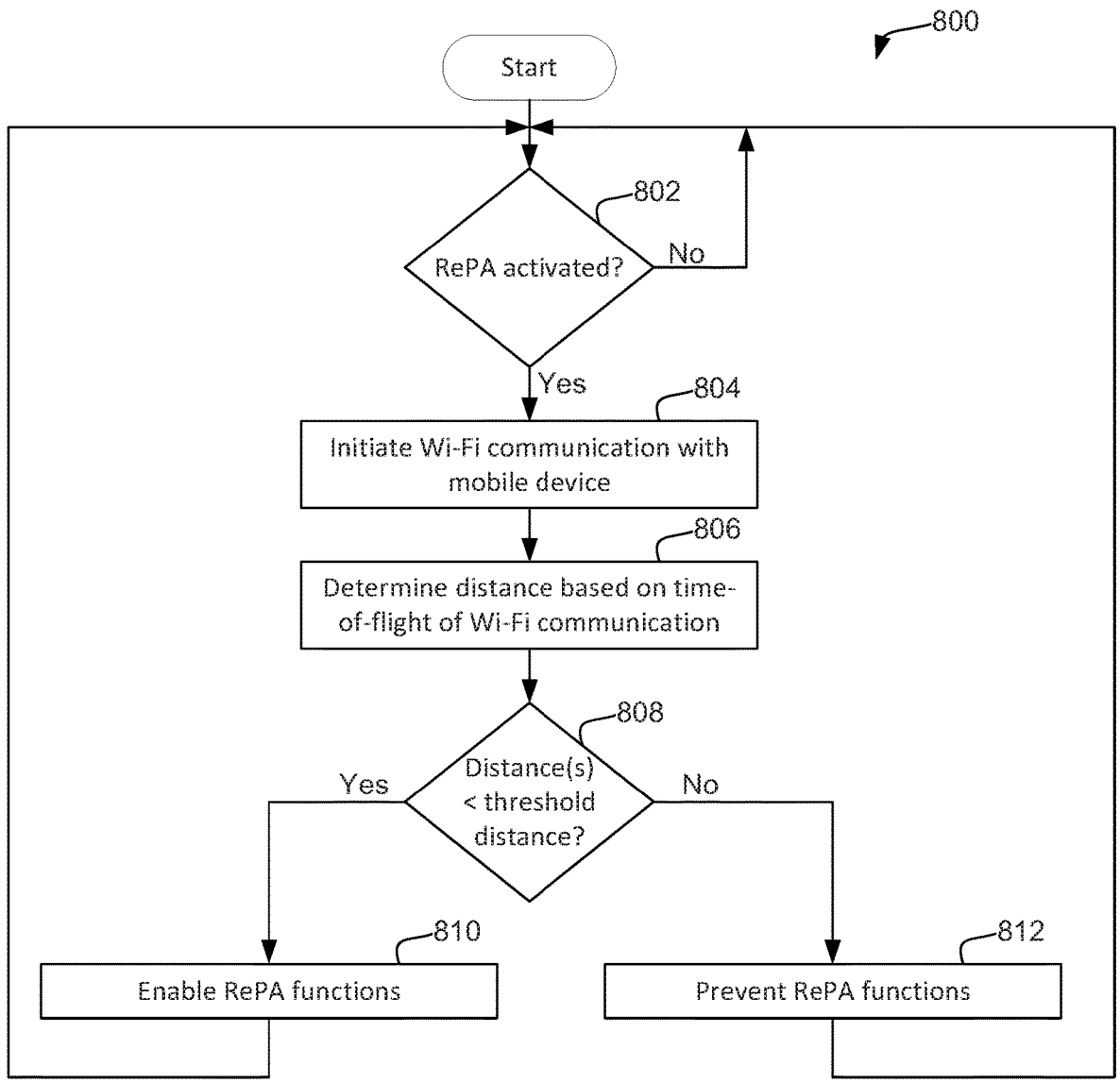
FIG. 8 is a flowchart of a method for activating remote park-assist for vehicles in accordance with the teachings herein.

FIG. 8 is a flowchart of an example method 800 for vehicles to activate remote park-assist. The flowchart of FIG. 8 is representative of machine readable instructions that are stored in memory (such as the memory 610 of FIG. 6) and include one or more programs which, when executed by a processor (such as the processor 608 of FIG. 6), cause the vehicle 100 to implement the example signal controller 128 of FIGS. 1 and 6. While the example program is described with reference to the flowchart illustrated in FIG. 8, many other methods of implementing the example signal controller 128 may alternatively be used. For example, the order of execution of the blocks may be rearranged, changed, eliminated, and/or combined to perform the method 800. Further, because the method 800 is disclosed in connection with the components of FIGS. 1-6, some functions of those components will not be described in detail below.

At block 802, the signal controller 128 determines whether remote park-assist has been activated. In response to the signal controller 128 determining that remote park-assist has not been activated, the method 800 returns to block 802. Otherwise, in response to the signal controller 128 determining that remote park-assist has been activated, the method 800 proceeds to block 804.

At block 804, the signal controller 128 activates the Wi-Fi communication module 126 of the vehicle 100 to initiate Wi-Fi communication between the Wi-Fi communication module 126 of the communication module 120 of the vehicle 100 and the Wi-Fi communication module 512 of the mobile device 102. At block 806, the signal controller 128 determines a distance (e.g., a second distance) based on a time-of-flight of the Wi-Fi communication between the vehicle 100 and the mobile device 102.

At block 808, the signal controller 128 whether the distance determined based upon the time-of-flight of the Wi-Fi communication is less than a threshold distance for performance of remote park-assist functions. In response to the signal controller 128 determining that the calculated distance is less than the threshold distance, the method 800 proceeds to block 810 at which the signal controller 128 enables the vehicle 100 to perform remote park-assist functions. Otherwise, in response to the signal controller 128 determining that the calculated distance is greater than the threshold distance, the method 800 proceeds to block 812 at which the signal controller 128 prevents the vehicle 100 from performing remote park-assist functions.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A vehicle comprising:
a controller to:
determine a first distance to a mobile device utilizing a signal strength of a first protocol communication;
determine, upon receiving an entry request, a second distance to the mobile device utilizing a time-of-flight of a second protocol communication; and
prevent entry when the second distance does not match the first distance,
wherein the first distance corresponds to a first range, the first range is determined based on the first distance and a first margin-of-error, the second distance corresponds to a second range that is determined based on the second distance and a second margin-of-error, and the controller determines that the second distance matches the first distance when the second range at least partially overlaps with the first range.

2. The vehicle of claim 1, wherein the controller detects a relay attack on communication with the mobile device in response to determining that the second distance does not match the first distance.

3. The vehicle of claim 1, wherein the second distance determined based on the second protocol communication has a smaller margin-of-error than the first distance determined based on the first protocol communication, and wherein the first protocol communication consumes less energy than the second protocol communication.

4. The vehicle of claim 1, wherein the controller receives the entry request after the mobile device is within a threshold approach distance of the vehicle, the entry request including at least one of a passive entry request and a passive start request.

5. The vehicle of claim 1, further including a door handle and a handle sensor, the controller is to receive the entry request from the handle sensor when the handle sensor detects that the door handle is engaged.

6. The vehicle of claim 1, further including a cabin and doors, wherein the controller prevents entry into the cabin by maintaining a locked state of the doors.

7. The vehicle of claim 1, further including an engine and an ignition switch for receiving an ignition request for the engine, wherein the controller is to:
initiate the second protocol communication between the vehicle and the mobile device responsive to receiving the ignition request;
determine the second distance utilizing the time-of-flight of the second protocol communication with the mobile device; and
prevent ignition of the engine when the second distance does not match the first distance.

8. The vehicle of claim 1, wherein the controller initiates the second protocol communication between the vehicle and the mobile device in response to receiving the entry request.

9. The vehicle of claim 1, wherein the time-of-flight corresponds to an amount of time for the vehicle to receive a first signal of the second protocol communication from the mobile device and the mobile device to receive a return signal of the second protocol communication from the vehicle.

10. The vehicle of claim 1, wherein the controller is configured to:
send and receive a series of signals of the second protocol communication;
identify start and end pulses for each of the signals; and
determine the time-of-flight for the second protocol communication based on the start and end pulses.

11. The vehicle of claim 1, wherein, to increase a time resolution of the time-of-flight, the controller is configured to stitch together a plurality of round trip signals between the vehicle and the mobile device.

12. The vehicle of claim 1, further including a low-frequency communication, wherein the controller is configured to determine a third distance to the mobile device based on the low-frequency communication and further prevent entry when the second distance does not match the third distance.

13. A system comprising:
a mobile device including a processor to:
determine, responsive to an entry request, whether a second protocol communication is activated for the mobile device; and
activate the second protocol communication in response to determining that the second protocol communication is not activated; and
a vehicle including a controller to:
determine a first distance between the vehicle and the mobile device utilizing a signal strength of a first protocol communication;
determine, upon receiving the entry request, a second distance between the vehicle and the mobile device utilizing a time-of-flight of the second protocol communication; and
prevent entry when the second distance does not match the first distance.

14. The system of claim 13, wherein the mobile device is a key fob or a phone-as-a-key.

15. A vehicle comprising:
a controller to:
determine a first distance to a mobile device utilizing a signal strength of a first protocol communication;
determine, upon receiving an entry request, a second distance to the mobile device utilizing a time-of-flight of the second protocol communication; and
prevent entry when the second distance does not match the first distance,
wherein, to increase a time resolution of the time-of-flight, the controller is configured to stitch together a plurality of round trip signals between the vehicle and the mobile device.

16. A vehicle comprising:
a controller to:
determine a first distance to a mobile device utilizing a signal strength of a first protocol communication;
determine, upon receiving an entry request, a second distance to the mobile device utilizing a time-of-flight of the second protocol communication; and
prevent entry when the second distance does not match the first distance; and
a low-frequency communication, wherein the controller is configured to determine a third distance to the mobile device based on the low-frequency communication and further prevent entry when the second distance does not match the third distance.

* * * * *